United States Patent
Tatsumi et al.

(10) Patent No.: US 11,777,120 B2
(45) Date of Patent: Oct. 3, 2023

(54) REDOX FLOW BATTERY

(71) Applicant: SUMITOMO ELECTRIC INDUSTRIES, LTD., Osaka (JP)

(72) Inventors: Ryouta Tatsumi, Osaka (JP); Hirokazu Kaku, Osaka (JP); Atsuo Ikeuchi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 150 days.

(21) Appl. No.: 17/429,971

(22) PCT Filed: Feb. 20, 2020

(86) PCT No.: PCT/JP2020/006942
§ 371 (c)(1),
(2) Date: Aug. 11, 2021

(87) PCT Pub. No.: WO2020/175340
PCT Pub. Date: Sep. 3, 2020

(65) Prior Publication Data
US 2022/0140371 A1    May 5, 2022

(30) Foreign Application Priority Data
Feb. 27, 2019 (JP) .............................. 2019-035027 U

(51) Int. Cl.
*H01M 8/04746* (2016.01)
*H01M 8/0289* (2016.01)
(Continued)

(52) U.S. Cl.
CPC ..... *H01M 8/04753* (2013.01); *H01M 8/0289* (2013.01); *H01M 8/0438* (2013.01); *H01M 8/04604* (2013.01); *H01M 8/188* (2013.01)

(58) Field of Classification Search
CPC ........... H01M 8/04753; H01M 8/0289; H01M 8/0438; H01M 8/04604; H01M 8/188
See application file for complete search history.

(56) References Cited

U.S. PATENT DOCUMENTS

2010/0323264 A1\* 12/2010 Chiang ............. H01M 8/04753
429/449
2011/0223450 A1\* 9/2011 Horne ..................... B60L 53/30
429/72

(Continued)

FOREIGN PATENT DOCUMENTS

CN     102148388 A    8/2011
EP       0303417 A1   2/1989
(Continued)

OTHER PUBLICATIONS

Machine Translation of KR-20200086757-A (Mar. 6, 2023) (Year: 2023).\*

*Primary Examiner* — Matthew J Merkling
(74) *Attorney, Agent, or Firm* — Oliff PLC

(57) ABSTRACT

A redox flow battery includes a tank configured to store an electrolyte and a distribution mechanism to distribute the electrolyte to a battery cell. The tank has a partition portion partitioning a space inside the tank into a first space and a second space, the distribution mechanism has a distribution passage through which the electrolyte is distributed between the first space and the second space via the battery cell, and the partition portion is composed of a flexible material.

12 Claims, 5 Drawing Sheets

(51) Int. Cl.
*H01M 8/0438* (2016.01)
*H01M 8/04537* (2016.01)
*H01M 8/18* (2006.01)

(56) References Cited

U.S. PATENT DOCUMENTS

2014/0193673 A1* 7/2014 Woolery ............... H01M 8/188
  429/105
2014/0220463 A1   8/2014 Daniel
2019/0341641 A1* 11/2019 Tomita .............. H01M 10/0587

FOREIGN PATENT DOCUMENTS

| EP | 3240078 A1 | | 11/2017 |
| JP | S62-229665 A | | 10/1987 |
| JP | H02-27666 A | | 1/1990 |
| KR | 20200086757 A | * | 7/2020 |

* cited by examiner

REDOX FLOW BATTERY

TECHNICAL FIELD

The present disclosure relates to a redox flow battery.

The present application claims the benefit of priority based on Japanese Patent Application No. 2019-035027 filed on Feb. 27, 2019, which is incorporated herein by reference in its entirety.

BACKGROUND ART

A redox flow type secondary battery disclosed in Patent Document 1 has a configuration in which one long meandering pipe or spiral pipe for storing an electrolyte is used, or a configuration in which two positive electrolyte tanks and two negative electrolyte tanks for storing electrolyte is used. The meandering pipe and the spiral pipe have a length such that an electrolyte in each pipe that is supplied to a battery cell and an electrolyte discharged from the battery cell to the pipe do not mix with each other.

On the other hand, if two positive electrolyte tanks and two negative electrolyte tanks are used, a positive electrolyte is supplied from one positive electrolyte tank to the battery cell, and is discharged from the battery cell to the other positive electrolyte tank. If all of the positive electrolyte in one positive electrolyte tank is to be distributed to the other positive electrolyte tank, a pump is driven in the reverse direction such that the positive electrolyte is supplied from the other positive electrolyte tank to the battery cell, and is discharged from the battery cell to the one positive electrolyte tank. The use of two positive electrolyte tanks and two negative electrolyte tanks in this manner prevents an electrolyte discharged from a battery cell from mixing with an electrolyte supplied to the battery cell.

CITATION LIST

Patent Documents

Patent Document 1: JP 112-27666A

SUMMARY OF INVENTION

A redox flow battery according to an aspect of the present disclosure is a redox flow battery including:
 a tank configured to store an electrolyte; and
 a distribution mechanism to distribute the electrolyte to a battery cell;
 in which the tank has a partition portion partitioning a space inside the tank into a first space and a second space,
 the distribution mechanism has a distribution passage through which the electrolyte is distributed between the first space and the second space via the battery cell, and
 the partition portion is composed of a flexible material.

DESCRIPTION OF EMBODIMENTS

Figure 1:
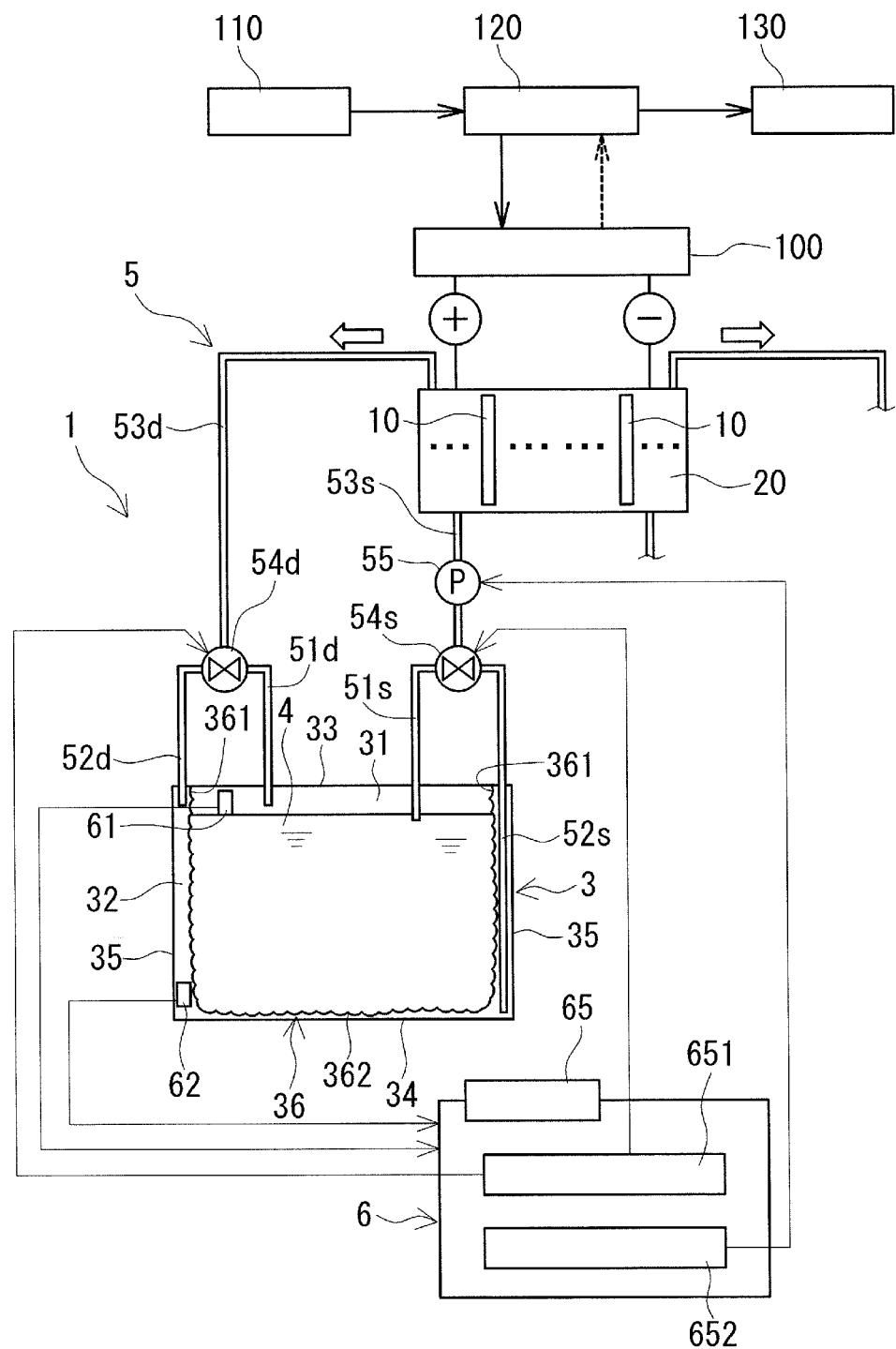
FIG. 1 is a configuration diagram showing an overview of a redox flow battery according to Embodiment 1.

Problem to be Solved by the Present Disclosure

The battery capacity and the amount of electrolyte of the redox flow battery are in a proportional relationship. That is, if a redox flow battery with a large battery capacity is to be constructed, the amount of electrolyte increases. If the amount of electrolyte increases, the length of the meandering pipe or the spiral pipe increases. As a result, pressure loss increases. If the amount of electrolyte is reduced and the length of the meandering pipe or the spiral pipe is reduced, an increase in pressure loss is suppressed. However, the battery capacity of the redox flow battery is reduced. Also, if two tanks for the positive electrolyte and two tanks for the negative electrolyte are used as described above, even if the amount of electrolyte is large, the increase in pressure loss is lower than in the case where a spiral pipe or the like is used. However, the area required for tank installation increases.

In view of this, an object of the present disclosure is to provide a redox flow battery that can prevent an electrolyte discharged from a battery cell to a tank and an electrolyte present in the tank from mixing with each other, without a reduction in the battery capacity, an increase in pressure loss, and an increase in the installation area.

Advantageous Effects of the Present Disclosure

A redox flow battery according to the present disclosure can prevent an electrolyte discharged from a battery cell to a tank and an electrolyte present in the tank from mixing with each other, without a reduction in the battery capacity, an increase in pressure loss, and an increase in the installation area.

DESCRIPTION OF EMBODIMENTS OF THE PRESENT DISCLOSURE

First, embodiments of the present disclosure will be described below.

(1) A redox flow battery according to an aspect of the present disclosure is a redox flow battery including:
 a tank configured to store an electrolyte; and
 a distribution mechanism to distribute the electrolyte to a battery cell;
 in which the tank has a partition portion partitioning a space inside the tank into a first space and a second space,
 the distribution mechanism has a distribution passage through which the electrolyte is distributed between the first space and the second space via the battery cell, and the partition portion is composed of a flexible material.

With the above-described configuration, it is possible, with one tank at each electrode, to prevent an electrolyte discharged from a battery cell to the tank and an electrolyte present in the tank from mixing with each other, without using a meandering pipe, a spiral pipe, or two tanks at each electrode as in a conventional manner. One reason for this is that due to the partition portion that partitions the tank being provided, the electrolyte to be supplied to the battery cell can be stored in one of the first space and the second space, and the electrolyte discharged from the battery cell can be stored in the other space. Averaging of the states of charge of the electrolyte is suppressed due to the electrolyte being prevented from mixing with each other. Therefore, the above-described configuration can suppress a continuous increase in cell resistance. Thus, the above-described configuration can improve battery efficiency, that is, the charge and discharge efficiency.

Also, the above-described configuration does not lead to a reduction in battery capacity, an increase in pressure loss, or an increase in installation area. One reason for this is that it is not necessary to use a meandering pipe, a spiral pipe, or two tanks at each electrode as in a conventional manner as described above. Another reason is that the partition portion that partitions the tank is composed of a flexible material, and thus a tank with a large volume need not be used.

(2) As an embodiment of the redox flow battery, the partition portion has an outer region provided at the entire peripheral edge of the partition portion and an inner region surrounded by the outer region, a region of the outer region that comes into contact with the electrolyte is substantially liquid-tightly fixed to an inner surface of the tank, and the inner region allows change in volumes of spaces such that the volume of one of the first space and the second space increases and the volume of the other space decreases along with an increase or a decrease in the amount of the electrolyte in the first space and the second space.

With the above-described configuration, because the outer region has a region that is substantially liquid-tightly fixed to the inner surface of the tank, it is possible, with one tank at each electrode, to further prevent the electrolyte discharged from the battery cell to the tank and an electrolyte present in the tank from mixing with each other. Also, the above-described configuration does not lead to a reduction in battery capacity, an increase in pressure loss, or an increase in installation area. One reason for this is that the volumes of the first space and the second space can change due to the inner region.

(3) As an embodiment of the redox flow battery, the distribution mechanism includes:

a first supply passage to supply the electrolyte in the first space to the battery cell;

a second supply passage to supply the electrolyte in the second space to the battery cell;

one supply-side connection passage connecting downstream sides of the first supply passage and the second supply passage to the battery cell;

a first discharge passage to discharge the electrolyte that has passed through the battery cell into the first space;

a second discharge passage to discharge the electrolyte that has passed through the battery cell into the second space;

one discharge-side connection passage connecting upstream sides of the first discharge passage and the second discharge passage to the battery cell;

a supply-side switching valve that is provided at a location where the first supply passage, the second supply passage, and the supply-side connection passage are connected to each other, the supply-side switching valve being configured to switch between allowing a flow of the electrolyte from the first supply passage to the supply-side connection passage and allowing a flow of the electrolyte from the second supply passage to the supply-side connection passage; and a discharge-side switching valve that is provided at a location where the first discharge passage, the second discharge passage, and the discharge-side connection passage are connected to each other, the discharge-side switching valve being configured to switch between allowing a flow of the electrolyte from the discharge-side connection passage to the first discharge passage and allowing a flow of the electrolyte from the discharge-side connection passage to the second discharge passage.

With the above-described configuration, it is possible to prevent the electrolyte discharged from the battery cell to a tank at each electrode and the electrolyte present in the tank from mixing with each other. One reason for this is that it is possible to discharge the electrolyte stored in one of the first space and the second space to the other space through the battery cell because the supply-side switching valve and the discharge-side switching valve are provided.

(4) An embodiment of the redox flow battery having the supply-side switching valve and the discharge-side switching valve includes:

a liquid amount detector configured to detect at least one of the amount of the electrolyte in the first space and the amount of the electrolyte in the second space; and a valve controller configured to control operations of the supply-side switching valve and the discharge-side switching valve based on a result of detection performed by the liquid amount detector.

With the above-described configuration, it is possible to prevent the electrolyte discharged from the battery cell to a tank at each electrode and the electrolyte present in the tank from mixing with each other. One reason for this is that the flow of the electrolyte can be switched after substantially all of the electrolyte stored in either the first space or the second space has been distributed to the other space through the battery cell.

(5) An embodiment of the redox flow battery having the supply-side switching valve and the discharge-side switching valve includes:

a presence/absence detector configured to detect whether or not a power request was made by a load to which power is to be supplied from the redox flow battery;

a calculation part configured to calculate a state of charge of the electrolyte in the first space and the state of charge of the electrolyte in the second space; and a valve controller configured to control operations of the supply-side switching valve and the discharge-side switching valve based on a result of detection performed by the presence/absence detector and a result of calculation performed by the calculation part.

With the above-described configuration, it is possible to perform charging and discharging in accordance with the presence or absence of a power request made by a load. One reason for this is that the flow of the electrolyte can be switched before the distribution of substantially all of the electrolyte stored in one of the first space and the second space to the other space through the battery cell ends.

(6) As an embodiment of the redox flow battery, the partition portion has an outer region provided at the entire peripheral edge of the partition portion and an inner region surrounded by the outer region, the outer region is fixed to a peripheral edge of a top plate of the tank, and the partition portion is suspended from the top plate of the tank, and the first space and the second space are provided in an inward space and an outward space inside the tank.

With the above-described configuration, the workability of manufacturing a tank having a partition portion is improved. One reason for this is that the outer region need only be fixed to the top plate. Also, the outer region can be fixed to the top plate in a state in which the top plate is detached from the tank.

Details of Embodiments of the Present Disclosure

Embodiments of the present disclosure will be described in detail below. The same reference numerals in the drawings indicate objects having the same names.

Embodiment 1

Redox Flow Battery

A redox flow battery according to Embodiment 1 will be described with reference FIGS. 1 to 4. The redox flow battery may be referred to as an RF battery 1 hereinafter. The RF battery 1 is provided with a tank 3 to store an electrolyte 4, and a distribution mechanism 5 to distribute the electrolyte 4 to a battery cell 10. One of the characteristics of the RF battery 1 is that a specific partition portion 36 partitioning the inner portion of the tank 3 into a first space 31 and a second space 32 is provided. An overview of the RF battery 1 will be described below, and then constituent elements of the RF battery 1 according to this embodiment will be described in detail.

Overview of RF Battery

The RF battery 1 is typically connected between a power generation portion 110 and a load 130 via an AC/DC converter 100 and a electrical substation 120, and the RF battery 1 is charged with and stores power generated by the power generation portion 110, and discharges and supplies the stored power to the load 130 (FIG. 1). The solid-line arrow extending from the electrical substation 120 shown in FIG. 1 toward the AC/DC converter 100 indicates charging. The dashed-line arrow extending from the AC/DC converter 100 shown in FIG. 1 toward the electrical substation 120 indicates discharging. Examples of the power generation portion 110 include a solar photovoltaic power generation device, a wind power generation device, and other general power plants. Examples of the load 130 include electric power consumers. With the RF battery 1, the electrolyte 4, which contains metal ions whose valence changes due to redox as active materials, is used for a positive electrolyte and a negative electrolyte. The RF battery 1 is charged and is discharged using the difference between the redox potential of ions contained in the positive electrolyte and the redox potential of ions contained in the negative electrolyte. Examples of metal ions include vanadium ions, titanium ions, and manganese ions. Examples of the solvent of the electrolyte 4 include an aqueous solution containing one or more acids selected from the group consisting of sulfuric acid, phosphoric acid, nitric acid, and hydrochloric acid, or an acid salt thereof. The RF battery 1 is used for load leveling applications, applications such as instantaneous low compensation and emergency power sources, and applications for smoothing the output of natural energy such as solar photovoltaic power generation and wind power generation, which are being introduced in large quantities.

Tank

The tank 3 stores the electrolyte 4 that is to be distributed to the battery cell 10 (FIG. 1). FIG. 1 shows only the tank 3 for a positive electrode. A tank for a negative electrode is not shown in FIG. 1. The configuration of the tank for a negative electrode may be the same as that of the tank 3 for a positive electrode. The size of the tank 3 can be selected as appropriate according to battery capacity. The shape of the tank 3 may be cuboid as in this example, or round columnar.

The tank 3 has a top plate 33, a bottom plate 34, side plates 35, and a partition portion 36, which will be described later. Examples of the materials of the top plate 33, the bottom plate 34, and the side plates 35 include resin and rubber that do not react with the electrolyte 4 and have high resistance to the electrolyte 4. Examples of the resin include polyvinyl chloride (PVC), polypropylene (PP), polyethylene (PE), and polytetrafluoroethylene (PTFE). In addition, the top plate 33, the bottom plate 34, and the side plates 35 may be composed of a plate provided with a steel plate-shaped member and a coating layer covering the portion of the plate-shaped member that comes into contact with the electrolyte 4. Examples of the material of the coating layer include above-described resin and rubber. The thickness of the top plate 33, the bottom plate 34, and the side plates 35 may be 5 mm or more and 50 mm or less, for example, and 10 mm or more and 40 mm or less, and in particular, 15 mm or more and 30 mm or less, for example. If each plate is composed of resin or rubber, the thickness thereof refers to the thickness of the resin or rubber, and if each plate is provided with a plate-shaped member and a coating layer, the thickness thereof refers to the total thickness of the plate-shaped member and the coating layer.

Partition Portion

The partition portion 36 partitions the space inside the tank 3 into the first space 31 and the second space 32. Examples of the material of the partition portion 36 include flexible materials that do not react with the electrolyte 4 and have high resistance to the electrolyte 4. The partition portion 36 composed of a flexible material refers to a member satisfying at least one of being flexible, being able to warp, not cracking when it is bent, and stretching to some extent. That is, the partition portion 36 has a property of deforming such that the volume of either the first space 31 or the second space 32 increases and the volume of the other one decreases when there are changes in the amount of the electrolyte 4 in the first space 31 and the second space 32. Specific examples of the material of the partition portion 36 include above-described resin and rubber. The partition portion 36 is composed of one flexible sheet member in this embodiment. The sheet member has a first surface, a second surface, and a third surface. The first surface and the second surface oppose each other. The third surface links the first surface and the second surface together.

The partition portion 36 has a thickness of 0.006 mm or more and 0.2 mm or less, for example. If the partition portion 36 is composed of a sheet member as in this embodiment, the thickness of the partition portion 36 refers to the length between the first surface and the second surface of the sheet member. If the thickness of the partition portion 36 is 0.2 mm or less, the partition portion 36 is not excessively thick, and thus has good properties described above. That is, the partition portion 36 can stretch and deform due to an increase or a decrease in the amount of the electrolyte 4 in the first space 31 and the second space 32. If the thickness of the partition portion 36 is 0.15 mm or less, the partition portion 36 has better properties described above. If the thickness of the partition portion 36 is 0.006 mm or more, the partition portion 36 is not excessively thin, and the partition portion 36 is unlikely to tear even if it is stretched and deformed due to an increase or a decrease in the amount of the electrolyte 4 in the first space 31 and the second space 32. If the partition portion 36 has a thickness of 0.03 mm or more, the partition portion 36 is unlikely to tear. The thickness of the partition portion 36 is also 0.03 mm or more and 0.13 mm or less, and in particular, 0.06 mm or more and 0.1 mm or less.

The partition portion 36 has an outer region 361 and an inner region 362, which will be described later in detail. The outer region 361 is provided over the entire peripheral edge of the partition portion 36. That is, the outer region 361 is provided over the entire peripheral edge of the first surface and the entire peripheral edge of the second surface of the sheet member. The outer region 361, that is, the entire peripheral edge of the first surface and the entire peripheral edge of the second surface, is a region with a certain width. The inner region 362 is surrounded by the outer region 361. That is, the inner region 362 is surrounded by the outer region 361 on the first surface of the sheet member, and is surrounded by the outer region 361 of the second surface of the sheet member.

Outer Region

The outer region 361 fixes the partition portion 36 to the inner surface of the tank 3. Specifically, a region of the outer region 361 that comes into contact with the electrolyte 4 is fixed to the inner surface of the tank 3. Of course, the outer region 361 may be fixed to the inner surface of the tank 3 over its entire periphery. There is no particular limitation on a method for fixing the outer region 361 to the tank 3 as long as the outer region 361 can be substantially liquid-tightly fixed to the inner surface of the tank 3. "Substantially liquid-tightly fixing" refers to allowing movement of a small amount of the electrolyte 4 from one of the first space 31 and the second space 32 to the other space via the outer region 361 to an extent that the state of charge of the electrolyte 4 is not affected. The amount of the electrolyte 4 that moves is preferably as small as possible, and preferably none moves at all. As a result of the outer region 361 being substantially liquid-tightly fixed, the partition portion 36 can substantially seal off the first space 31 and the second space 32 from each other, and preferably completely seal them off from each other. Therefore, the partition portion 36 can prevent the electrolyte 4 in the first space 31 and the electrolyte 4 in the second space 32 from mixing with each other. In this embodiment, the outer region 361 is substantially liquid-tightly fixed to the inner surface of the tank 3 over its entire periphery. Examples of a method for fixing the outer region 361 include welding, fusion, and adhesion using an adhesive.

Figure 4:
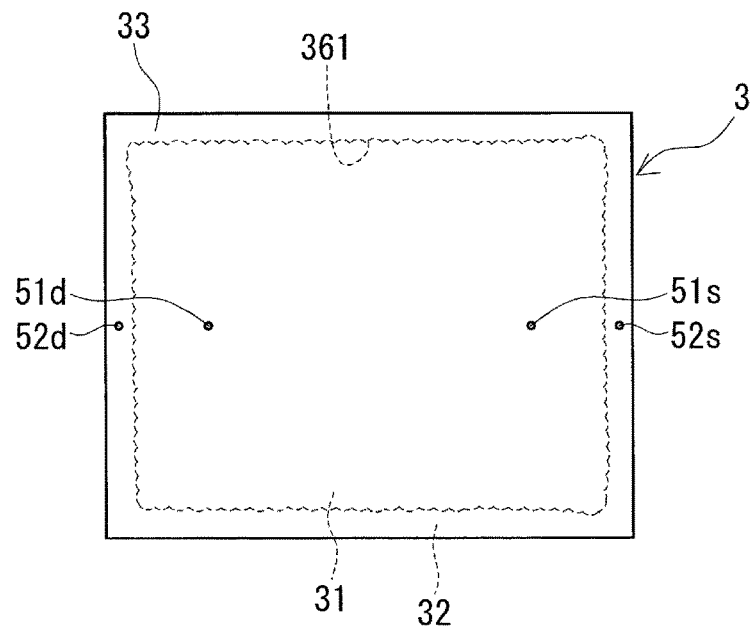
FIG. 4 is a top view of a tank provided in the redox flow battery according to Embodiment 1.

There is no particular limitation on the fixed location of the outer region 361 as long as the first space 31 and the second space 32 can be formed such that the same amount of the electrolyte 4 can be stored in the first space 31 and the second space 32, and the fixed location of the outer region 361 can be selected as appropriate. It is preferable that the fixed location of the outer region 361 is a position where the volume of the first space 31 and the volume of the second space 32 are the same as each other. The fixed location of the outer region 361 is the top plate 33 in this example (FIG. 4). Specifically, the outer region 361 is fixed to a region on the peripheral edge side of the top plate 33 of the tank 3 over its entire periphery. Because the outer region 361 is fixed to the top plate 33, the workability of manufacturing the tank 3 having the partition portion 36 is improved. One reason for this is that it is sufficient that the outer region 361 is fixed only to the top plate 33. Also, the outer region 361 can be fixed to the top plate 33 in a state in which the top plate 33 is detached from the side plates 35. The partition portion 36 is suspended from the top plate 33 because the outer region 361 is fixed to the top plate 33. Also, the first space 31 and the second space 32 are formed in an inward space and an outward space inside the tank 3.

Inner Region

It is preferable that the inner region 362 allows change in the volumes of the first space 31 and the second space 32 along with an increase or a decrease in the amount of the electrolyte 4 in the first space 31 and the second space 32 (FIG. 1). Specifically, the inner region 362 allows an increase in the volume of either the first space 31 or the second space 32 and a reduction in the volume of the other one. Because the partition portion 36 is composed of a flexible material, the inner region 362 is biased toward the first space 31 or the second space 32 or stretches toward the first space 31 or the second space 32. Therefore, the inner region 362 can change the volumes of the first space 31 and the second space 32.

Distribution Mechanism

The distribution mechanism 5 distributes the electrolyte 4 to the battery cell 10. The distribution mechanism 5 has a distribution passage through which the electrolyte 4 is distributed between the first space 31 and the second space 32 via the battery cell 10. The distribution mechanism 5 in this embodiment has a first supply passage 51$s$, a second supply passage 52$s$, a supply-side connection passage 53$s$, a supply-side switching valve 54$s$, a first discharge passage 51$d$, a second discharge passage 52$d$, a discharge-side connection passage 53$d$, a discharge-side switching valve 54$d$, and a pump 55. FIG. 1 shows only the distribution mechanism 5 for the positive electrode. The distribution mechanism for the negative electrode is not shown in FIG. 1. The configuration of the distribution mechanism for the negative electrode may be the same as that of the distribution mechanism 5 for the positive electrode.

The first supply passage 51$s$ supplies the electrolyte 4 in the first space 31 of the tank 3 to the battery cell 10. The upstream side of the first supply passage 51$s$ is open in the first space 31. If the electrolyte 4 is stored in the first space 31, the upstream side of the first supply passage 51$s$ is open in the electrolyte 4 (FIG. 1). The downstream side of the first supply passage 51$s$ is connected to the supply-side connection passage 53$s$.

Figure 2:
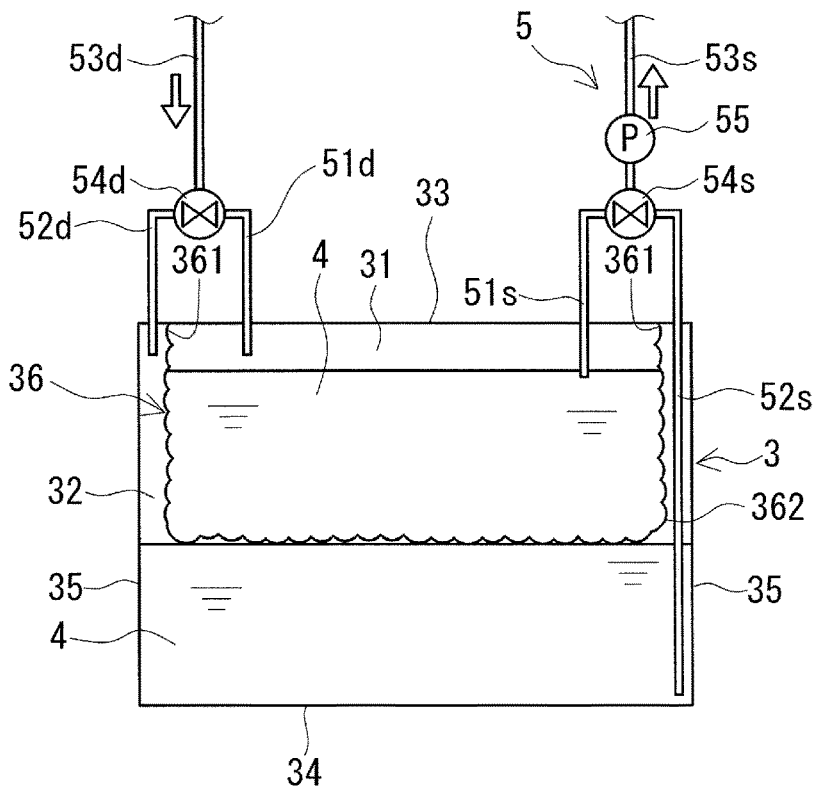
FIG. 2 is a configuration diagram illustrating a path through which an electrolyte of the redox flow battery according to Embodiment 1 is distributed.
Figure 3:
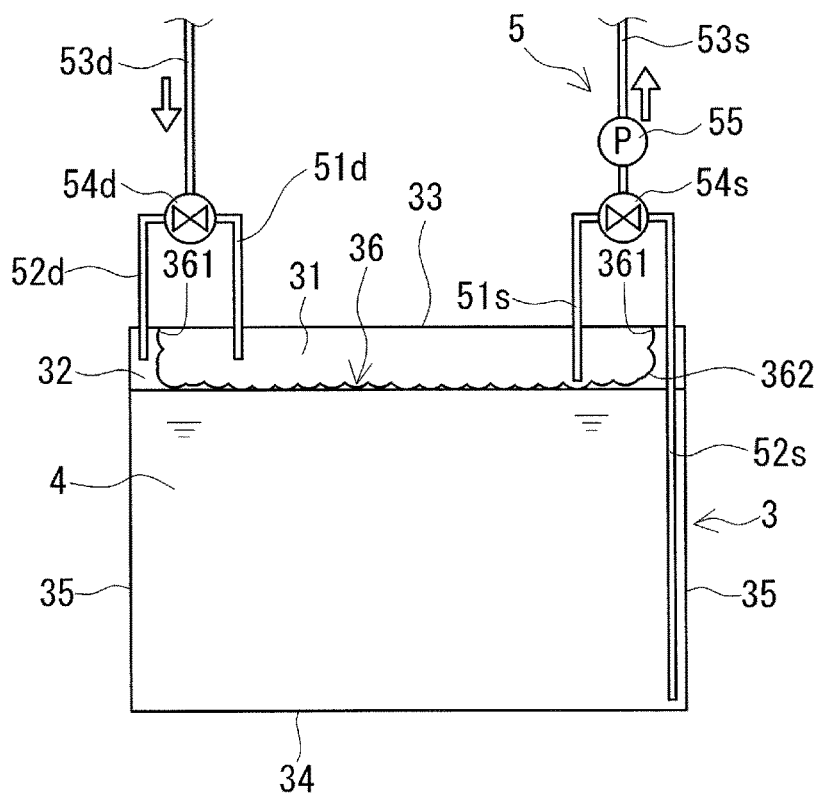
FIG. 3 is a configuration diagram illustrating the path through which the electrolyte of the redox flow battery according to Embodiment 1 is distributed.

The second supply passage 52$s$ supplies the electrolyte 4 in the second space 32 of the tank 3 to the battery cell 10. The upstream side of the second supply passage 52$s$ is open in the second space 32. If the electrolyte 4 is stored in the second space 32, the upstream side of the second supply passage 52$s$ is open in the electrolyte 4 (FIGS. 2 and 3). The downstream side of the second supply passage 52$s$ is connected to the supply-side connection passage 53$s$.

The supply-side connection passage 53$s$ connects the downstream sides of the first supply passage 51$s$ and the second supply passage 52$s$ to the battery cell 10. The electrolyte 4 that flows through the first supply passage 51$s$ or the second supply passage 52$s$ is supplied to the battery cell 10 through the supply-side connection passage 53$s$.

The supply-side switching valve 54$s$ opens one of the first supply passage 51$s$ and the second supply passage 52$s$ and closes the other one. That is, the supply-side switching valve 54*s* switches between allowing the flow of the electrolyte 4 from the first supply passage 51*s* to the supply-side connection passage 53*s* and allowing the flow of the electrolyte 4 from the second supply passage 52*s* to the supply-side connection passage 53*s*. An example of the location where the supply-side switching valve 54*s* is installed is the location where the first supply passage 51*s*, the second supply passage 52*s*, and the supply-side connection passage 53*s* are connected to each other. An example of the type of supply-side switching valve 54*s* is a three-way valve.

The first discharge passage 51*d* discharges the electrolyte 4 that has passed through the battery cell 10 into the first space 31. The upstream side of the first discharge passage 51*d* is connected to the discharge-side connection passage 53*d*. The downstream side of the first discharge passage 51*d* is open in the first space 31. If the electrolyte 4 is stored in the first space 31, the downstream side of the first discharge passage 51*d* is open in a gas phase portion in the first space 31 (FIG. 1).

The second discharge passage 52*d* discharges the electrolyte 4 that has passed through the battery cell 10 into the second space 32. The upstream side of the second discharge passage 52*d* is connected to the discharge-side connection passage 53*d*. The downstream side of the second discharge passage 52*d* is open in the second space 32. If the electrolyte 4 is stored in the second space 32, the downstream side of the second discharge passage 52*d* is open in a gas phase portion in the second space 32 (FIGS. 2 and 3).

The discharge-side connection passage 53*d* connects the upstream sides of the first discharge passage 51*d* and the second discharge passage 52*d* to the battery cell 10. The electrolyte 4 discharged from the battery cell 10 flows through the discharge-side connection passage 53*d* and then through the first discharge passage 51*d* or the second discharge passage 52*d*.

The discharge-side switching valve 54*d* opens one of the first discharge passage 51*d* and the second discharge passage 52*d* and closes the other one. That is, the discharge-side switching valve 54*d* switches between allowing the flow of the electrolyte 4 from the discharge-side connection passage 53*d* to the first discharge passage 51*d* and allowing the flow of the electrolyte 4 from the discharge-side connection passage 53*d* to the second discharge passage 52*d*. An example of the location where the discharge-side switching valve 54*d* is installed is the location where the discharge-side connection passage 53*d*, the first discharge passage 51*d*, and the second discharge passage 52*d* are connected to each other. Similarly to the supply-side switching valve 54*s*, an example of the type of discharge-side switching valve 54*d* is a three-way valve.

The first supply passage 51*s*, the second supply passage 52*s*, the supply-side connection passage 53*s*, the first discharge passage 51*d*, the second discharge passage 52*d*, and the discharge-side connection passage 53*d* may be constituted by a resin pipe or a coated pipe, for example. An example of the material of the resin pipe is polyvinyl chloride. The coated pipe is provided with a metal pipe-shaped member, and a coating layer covering a portion of the pipe-shaped member that is in contact with the electrolyte 4. A stainless steel pipe may be used as the pipe-shaped member, for example. Examples of the material of the coating layer includes materials that do not react with the electrolyte 4 and have high resistance to the electrolyte 4. Specific examples of the material of the coating layer include materials such as resin and rubber that are similar to those of the above-described tank 3.

The pump 55 pressure-feeds the electrolyte 4 in the first space 31 or the second space 32 to the second space 32 or the first space 31 via the battery cell 10. The location where the pump 55 is installed is an intermediate position of the supply-side connection passage 53*s* in this example. The pump 55 is driven during charging and discharging operations. These operations will be described when describing a controller 65 later. The pump 55 is stopped during a standby operation in which charging or discharging operation is not performed. The electrolyte 4 is not pressure-fed during this standby operation. The type of pump 55 may be selected as appropriate, and an example thereof is a self-priming pump.

The supply-side switching valve 54*s*, the discharge-side switching valve 54*d*, and the pump 55 are controlled by a control mechanism 6, which will be described later.

Control Mechanism

The control mechanism 6 controls the flow of the electrolyte 4 in the first space 31 and the flow of the electrolyte 4 in the second space 32 based on the amounts of the electrolyte in the first space 31 and the second space 32. The control mechanism 6 in this embodiment has a liquid amount detector and a controller 65.

Liquid Amount Detector

The liquid amount detector detects at least one of the amount of the electrolyte in the first space 31 and the amount of the electrolyte in the second space 32. In this embodiment, the liquid amount detector has a first liquid amount detector 61 to detect the amount of the electrolyte in the first space 31 and a second liquid amount detector 62 to detect the amount of the electrolyte in the second space 32. For convenience of description, the first liquid amount detector 61 and the second liquid amount detector 62 are not shown in FIGS. 2 and 3. The first liquid amount detector 61 detects whether or not the amount of the electrolyte in the first space 31 is substantially zero, for example. Similarly, the second liquid amount detector 62 detects whether or not the amount of the electrolyte in the second space 32 is substantially zero.

Examples of types of first liquid amount detector 61 and second liquid amount detector 62 include switches and sensors. Examples of the switches include level switches such as float-type switches. Examples of the sensors include liquid amount sensors and liquid level sensors such as float-type, capacitance-type, optical, and ultrasonic sensors. The results of detection performed by the first liquid amount detector 61 and the second liquid amount detector 62 are sent to the controller 65.

Controller

The controller 65 has a valve controller 651 and a pump controller 652. A computer or the like can be used as the controller 65, for example.

Valve Controller

The valve controller 651 controls operations of the supply-side switching valve 54*s* and the discharge-side switching valve 54*d* based on the results of detection performed by the liquid amount detectors. The valve controller 651 operates the supply-side switching valve 54*s* so as to open one of the first supply passage 51*s* and the second supply passage 52*s* and close the other one. Also, the valve controller 651 operates the discharge-side switching valve 54*d* so as to open one of the first discharge passage 51*d* and the second discharge passage 52*d* and close the other one.

Pump Controller

The pump 55 is driven under the control of the pump controller 652 based on the results of detection performed by the liquid amount detectors. In other words, the pump controller 652 performs control in conjunction with the control of the valve controller 651 performed on the supply-side switching valve 54s and the discharge-side switching valve 54d. The pump controller 652 drives and stops the pump 55.

Control Procedure

A procedure in which the flow of the electrolyte 4 in the first space 31 and the flow of the electrolyte 4 in the second space 32 are controlled by the controller 65 will be described below. A case where the electrolyte 4 is charged will be described here as an example.

First Procedure

As shown in FIG. 1, if substantially all of the electrolyte 4 is stored in the first space 31 and substantially none of the electrolyte 4 is stored in the second space 32, the second liquid amount detector 62 detects that the amount of the electrolyte in the second space 32 is zero. The valve controller 651 operates the supply-side switching valve 54s so as to open the first supply passage 51s and close the second supply passage 52s based on the detection results. Also, the valve controller 651 operates the discharge-side switching valve 54d so as to open the second discharge passage 52d and close the first discharge passage 51d. The pump controller 652 drives the pump 55 in conjunction with the control of the valve controller 651. Due to this control, the electrolyte 4 stored in the first space 31 passes through the first supply passage 51s and the supply-side connection passage 53s in this order, and is supplied to the battery cell 10 and is charged. The electrolyte 4 charged in the battery cell 10 is discharged from the battery cell 10 into the second space 32, passing through the discharge-side connection passage 53d and the second discharge passage 52d in this order (FIG. 2). As shown in FIG. 3, the valve controller 651 and the pump controller 652 maintain the states of the supply-side switching valve 54s, the discharge-side switching valve 54d, and the pump 55 until substantially all of the electrolyte 4 in the first space 31 has been sent into the second space 32, that is, until the first liquid amount controller 61 (FIG. 1) detects that the amount of the electrolyte in the first space 31 is zero. In this manner, all of the electrolyte 4 that has been charged is stored in the second space 32. When all of the electrolyte 4 that has been charged is stored in the second space 32, the pump controller 652 stops the pump 55.

Second Procedure

As shown in FIG. 3, if substantially all of the electrolyte 4 is stored in the second space 32 and substantially none of the electrolyte 4 is stored in the first space 31, the first liquid amount detector 61 (FIG. 1) detects that the amount of the electrolyte in the first space 31 is zero. The valve controller 651 performs control based on the detection results such that this procedure is the reverse of the first procedure. That is, the valve controller 651 operates the supply-side switching valve 54s so as to open the second supply passage 52s and close the first supply passage 51s. Also, the valve controller 651 operates the discharge-side switching valve 54d so as to open the first discharge passage 51d and close the second discharge passage 52d. The pump controller 652 drives the pump 55. Due to this control, the electrolyte 4 stored in the second space 32 passes through the second supply passage 52s and the supply-side connection passage 53s in this order, and is supplied to the battery cell 10 and is charged. The electrolyte 4 charged in the battery cell 10 is ejected from the battery cell 10 into the first space 31, passing through the discharge-side connection passage 53d and the first discharge passage 51d in this order (FIG. 2). As shown in FIG. 1, the valve controller 651 and the pump controller 652 maintain the states of the supply-side switching valve 54s, the discharge-side switching valve 54d, and the pump 55 until substantially all of the electrolyte 4 in the second space 32 has been sent into the first space 31, that is, until the second liquid amount detector 62 detects that the amount of the electrolyte in the second space 32 is zero. In this manner, all of the electrolyte 4 that has been charged is stored in the first space 31.

The controller 65 repeats the first procedure and the second procedure until the state of charge of the electrolyte 4 reaches a fully charged state. When the state of charge of the electrolyte 4 reaches the fully charged state, the controller 65 ends the first procedure and the second procedure.

Note that if the state of charge of the electrolyte 4 reaches the fully charged state after passing through the battery cell 10 once or twice, the controller 65 need not repeat the first procedure or the second procedure. In this case, the controller 65 need only perform at least one of the first procedure and the second procedure.

Battery Cell

The battery cell 10 is separated into a positive electrode cell and a negative electrode cell by a membrane that allows permeation of hydrogen ions. The membrane, the positive electrode cell, and the negative electrode cell are not shown in the drawings. The positive electrode cell has a built-in positive electrode. The positive electrolyte is distributed by the above-described distribution mechanism 5 from the above-described tank 3 into the positive electrode cell. The negative electrode cell has a built-in negative electrode. The negative electrolyte is distributed by the above-described distribution mechanism 5 from the above-described tank for the negative electrode into the negative electrode cell. The battery cell 10 is usually formed inside a structure called cell stack 20.

Cell Stack

The cell stack 20 is constituted by a layered body called a sub-stack, two end plates that sandwich the layered body from both sides, and a fastening mechanism that fastens the two end plates. The layered body, the end plates, and the fastening mechanism are not shown in the drawings. The number of sub-stacks may be one or higher. The sub-stack has the layered body in which a plurality of cell frames, positive electrodes, membranes, and negative electrodes are stacked on each other in the stated order, and supply/discharge plates that are arranged on the two ends of the layered body. Each cell frame has a bipolar plate and a frame body that surrounds an outer peripheral edge portion of the bipolar plate. One battery cell 10 is formed between bipolar plates of cell frames that are adjacent to each other. The positive electrode cells and the negative electrode cells are arranged such that the positive electrode and the negative electrode of battery cells 10 that are adjacent to each other are respectively arranged on the front and back sides of the bipolar plate that is arranged therebetween. The frame body of a cell frame has a liquid supply manifold and a liquid supply slit to supply the electrolyte 4 into the battery cell 10, and a liquid discharge manifold and a liquid discharge slit to discharge the electrolyte 4 to the outside of the battery cell 10. An annular sealing member such as an O-ring or flat packing is arranged in an annular sealing groove between frame bodies so as to suppress leakage of the electrolyte 4 from the battery cell 10. A known battery cell and a known cell stack can be used as the battery cell 10 and the cell stack 20.

Effects

In the RF battery 1 of this embodiment, it is possible, with one tank 3 at each electrode, to prevent the electrolyte 4 discharged from the battery cell 10 to the tank 3 and the electrolyte 4 in the tank 3 from mixing with each other, without using a meandering pipe, a spiral pipe, or two tanks at each electrode as in a conventional manner. One reason for this is that the electrolyte 4 to be supplied to the battery cell 10 can be stored in either the first space 31 or the second space 32 due to the partition portion 36 that partitions the tank 3 being provided, and the electrolyte 4 discharged from the battery cell 10 can be stored in the other space. Another reason is that it is possible to discharge the electrolyte 4 stored in either the first space 31 or the second space 32 to the other space through the battery cell 10 because the supply-side switching valve 54s and the discharge-side switching valve 54d are provided. Another reason is that, because the valve controller 651 is provided, the flow of the electrolyte 4 can be switched after substantially all of the electrolyte 4 stored in either the first space 31 or the second space 32 has been distributed to the other space through the battery cell 10.

Also, the RF battery 1 of this embodiment does not lead to a reduction in the battery capacity, an increase in pressure loss, or an increase in installation area. This is because it is not necessary to use a meandering pipe, a spiral pipe, or two tanks at each electrode as in a conventional manner as described above. Furthermore, this is because the partition portion 36 that partitions the tank 3 is composed of a flexible material, and the volumes of the first space 31 and the second space 32 can change due to the inner region 362, and therefore the tank 3 with a large volume need not be used.

Embodiment 2

Redox Flow Battery

In Embodiment 1 described above, the first space 31 and the second space 32 are provided in an inward space and an outward space inside the tank 3 due to the partition portion 36. Embodiment 2 will be described with reference to FIGS. 5 to 7 in which the locations where the first space 31 and the second space 32 are formed are different from those in the RF battery 1 of Embodiment 1. That is, the RF battery 1 of Embodiment 2 is different from the RF battery 1 of Embodiment 1 with regard to the location where the outer region 361 is fixed. The following mainly describes the difference from Embodiment 1. Configurations that are the same as those of Embodiment 1 will not be described. The same applies to Embodiment 3, which will be described later. Note that the electrolyte is not shown in FIGS. 5 to 7 for convenience of description.

Tank

Partition Portion

Figure 5:
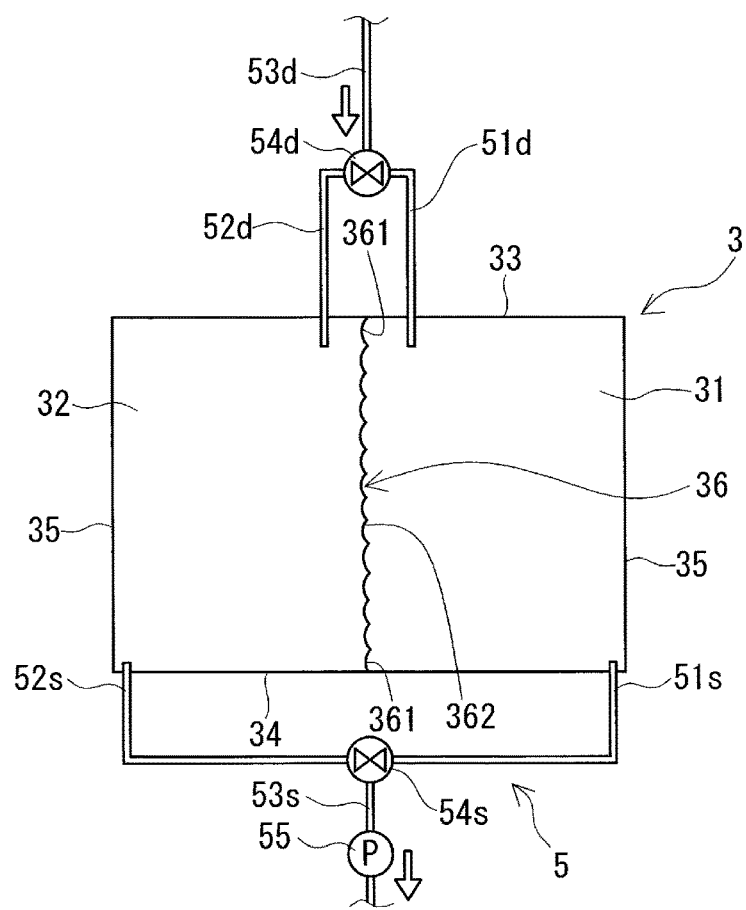
FIG. 5 is a configuration diagram showing an overview of examples of a tank and a distribution mechanism provided in a redox flow battery according to Embodiment 2.
Figure 6:
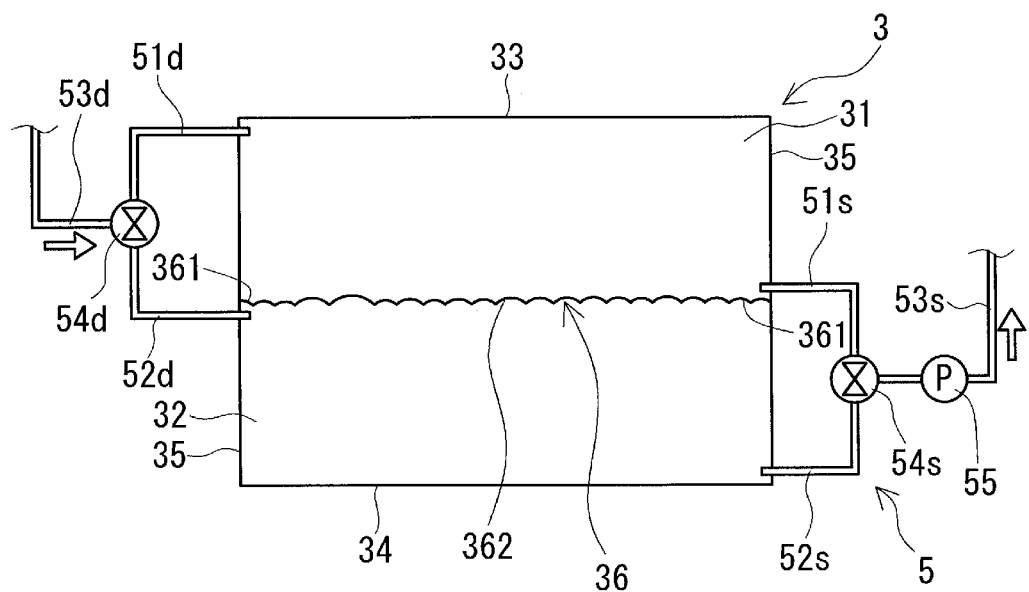
FIG. 6 is a configuration diagram showing an overview of other examples of the tank and the distribution mechanism provided in the redox flow battery according to Embodiment 2.
Figure 7:
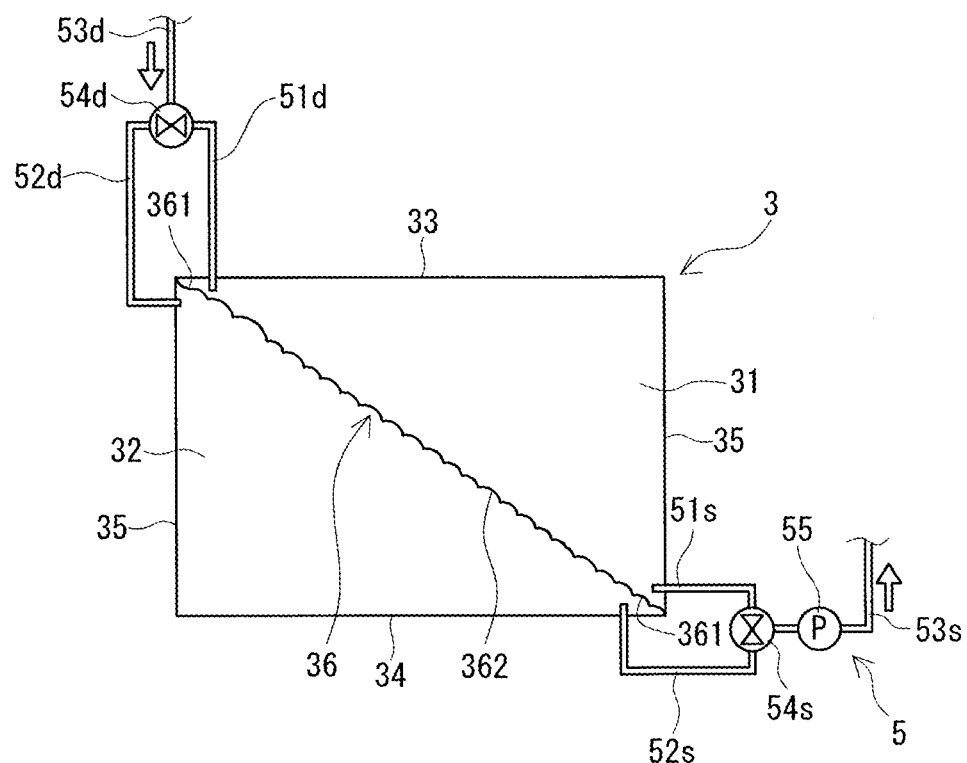
FIG. 7 is a configuration diagram showing an overview of other examples of the tank and the distribution mechanism provided in the redox flow battery according to Embodiment 2.

As shown in FIG. 5, the outer region 361 may be fixed to a top plate 33, side plates 35, and a bottom plate 34 such that a first space 31 and a second space 32 are provided on the left side and the right side inside the tank 3. Also, as shown in FIG. 6, the outer region 361 may be fixed to the side plates 35 over the entire periphery thereof such that the first space 31 and the second space 32 are provided on the upper side and the lower side inside the tank 3. Furthermore, as shown in FIG. 7, the outer region 361 may be fixed to a corner portion between the top plate 33 and one side plate 35, the side plates 35, and a corner portion between the other side plate 35 and the bottom plate 34 such that the first space 31 and the second space 32 are provided at diagonal positions inside the tank 3.

Effects

Similarly to the RF battery 1 of Embodiment 1, the RF battery 1 of this embodiment can prevent the electrolyte 4 discharged from the battery cell 10 to the tank 3 and the electrolyte 4 present in the tank 3 from mixing with each other, without a reduction in the battery capacity, an increase in pressure loss, and an increase in the installation area.

Embodiment 3

Redox Flow Battery

In Embodiment 1 described above, the timing when the flow of the electrolyte 4 is switched by the valve controller 651 comes after substantially all of the electrolyte 4 stored in either the first space 31 or the second space 32 has been distributed into the other space through the battery cell 10. In the RF battery 1 of Embodiment 3 that will be described with reference to FIG. 8, the above-described timing is different from that of the RF battery 1 of Embodiment 1. Specifically, one of the above-described timings comes before substantially all of the electrolyte 4 stored in one space has been distributed into the other space through the battery cell 10. That is, one of the above-described timings comes while the electrolyte 4 stored in one space is being distributed into the other space through the battery cell 10.

Controller

A controller 65 has a presence/absence detector 653 and a calculation part 654 in addition to a valve controller 651 and a pump controller 652 that are similar to those of Embodiment 1. The valve controller 651 of this embodiment controls operations of a supply-side switching valve 54s and a discharge-side switching valve 54d based on the results of detection performed by the presence/absence detector 653 and the results of calculation performed by the calculation part 654. Similarly to the above description, the valve controller 651 operates the supply-side switching valve 54s so as to open one of the first supply passage 51s and the second supply passage 52s and close the other one. Also, the valve controller 651 operates the discharge-side switching valve 54d so as to open one of the first discharge passage 51d and the second discharge passage 52d and close the other one. Similarly to the above description, the pump controller 652 drives the pump 55 in conjunction with the control of the valve controller 651.

Presence/Absence Detector

The presence/absence detector 653 detects whether or not a power request was made by a load 130. If the detection result indicates that the request was made, the RF battery 1 performs a discharging operation. If the detection result indicates that the request was not made, the RF battery 1 performs a charging operation. It is possible to detect the presence or absence of the power request made by the load 130 based on the operation of the AC/DC converter 100 performed by an instruction received from a load dispatching center or the like.

Calculation Part

The calculation part 654 calculates the state of charge (SOC) of the electrolyte 4 in the first space 31 and the state of charge (SOC) of the electrolyte 4 in the second space 32. The state of charge of the electrolyte 4 can be obtained using a measurement part 10m.

Figure 8:
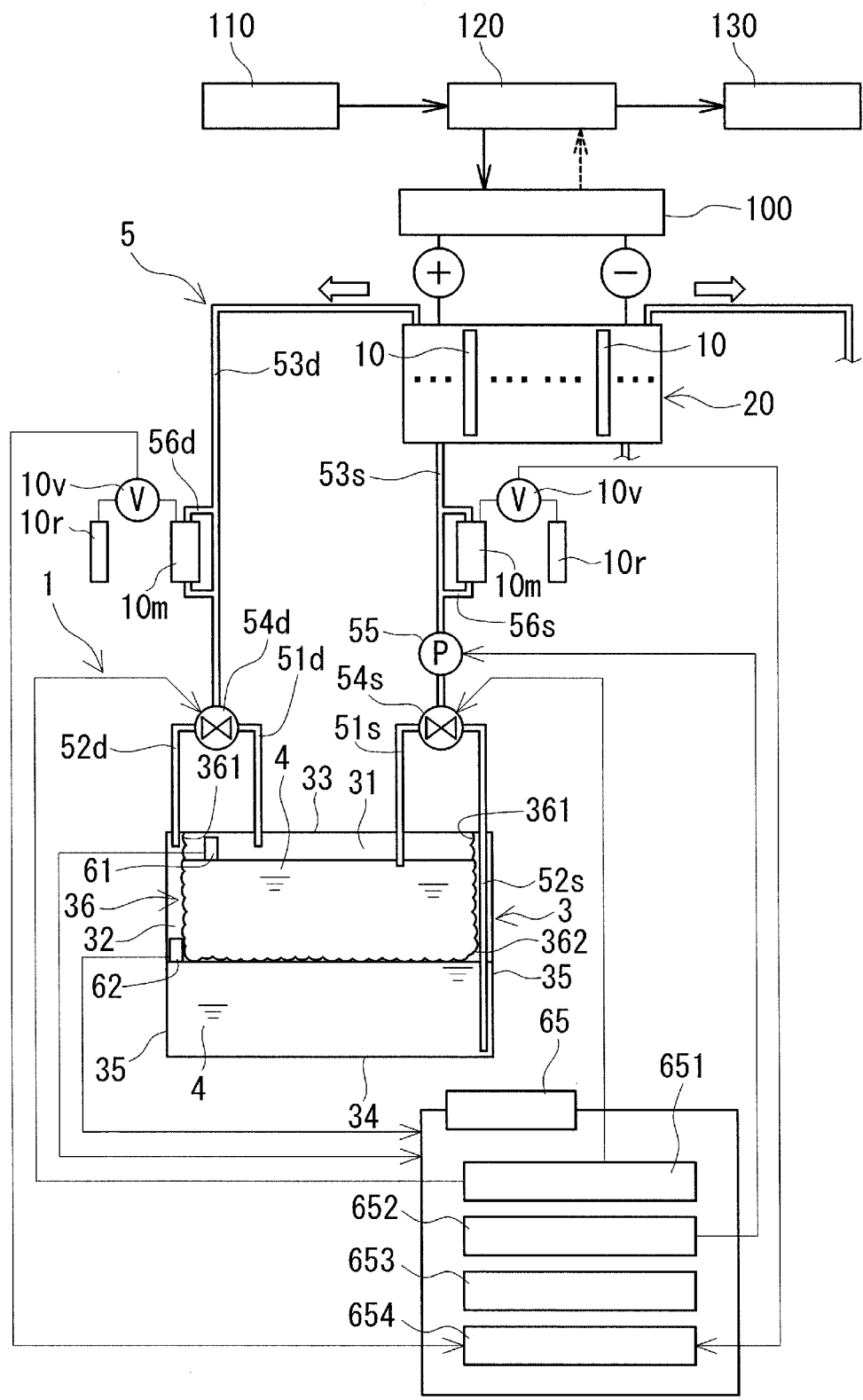
FIG. 8 is a configuration diagram showing an overview of a redox flow battery according to Embodiment 3.

In this embodiment, the state of charge of the electrolyte 4 supplied to the battery cell 10 and the state of charge of the electrolyte 4 that has passed through the battery cell 10 are calculated using the measurement parts 10m provided on the upstream side and the downstream side of the battery cell 10. The upstream measurement part 10m is provided in an intermediate portion of a branched passage 56s branched from the supply-side connection passage 53s. The electrolyte 4 that has passed through the upstream measurement part 10m is returned to the supply-side connection passage 53s and is sent to the battery cell 10. The downstream measurement part 10*m* is provided in an intermediate portion of a branched passage 56*d* branched from the discharge-side connection passage 53*d*. The electrolyte 4 that has passed through the downstream measurement part 10*m* is returned to the discharge-side connection passage 53*d* and is sent to the tank 3. Only either one of the positive electrode and negative electrolyte 4 is supplied to both measurement parts 10*m*. FIG. 8 shows a configuration in which the positive electrolyte is supplied to the two measurement parts 10*m*. The same measurement parts are also provided on the upstream side and the downstream side of the battery cell 10 in the distribution mechanism that distributes the negative electrolyte. The measurement parts in the distribution mechanism for the negative electrolyte are not shown in the drawings.

Standard electrodes 10*r* with known potentials are respectively connected to the upstream measurement part 10*m* and the downstream measurement part 10*m*. A saturated KCl silver-silver chloride electrode ($A_g/A_g$Cl/saturated KCl solution) can be used as the standard electrode 10*r*, for example. Voltage measurement parts 10*v* to measure the absolute potential of an electrolyte are respectively provided between the upstream measurement part 10*m* and the standard electrode 10*r* and between the downstream measurement part 10*m* and the standard electrode 10*r*. A voltmeter can be used as the voltage measurement part 10*v*. The results of measurement performed by the voltage measurement parts 10*v* are sent to the calculation part 654 and are used to calculate the state of charge of the electrolyte 4. This calculation is performed by a computer.

It is possible to determine whether the electrolyte 4 is to be distributed to the first space 31 or the second space 32 based on the control of the valve controller 651 on the supply-side switching valve 54*s* and the discharge-side switching valve 54*d*. The states of charge of the electrolyte 4 in the first space 31 and the second space 32 can be obtained based on the state of calculated charge of the electrolyte 4 and the distribution path of the electrolyte 4 formed by controlling the supply-side switching valve 54*s* and the discharge-side switching valve 54*d*.

Note that the state of charge of the electrolyte 4 may be obtained as a result of respectively providing monitor cells having the same configuration as that of the battery cell 10 on the upstream side and the downstream side of the battery cell 10 and measuring the open-circuit potentials of the monitor cells, instead of using the measurement parts 10*m* and the standard electrodes 10*r*. The measured open-circuit potentials are sent to the calculation part 654 and are used to calculate the state of charge of the electrolyte 4.

Control Procedure

When the presence/absence detector 653 has detected that the power request was made, the calculation part 654 calculates the state of charge of the electrolyte 4 in the first space 31 and the state of charge of the electrolyte 4 in the second space 32. The valve controller 651 controls the operations of the supply-side switching valve 54*s* and the discharge-side switching valve 54*d* such that out of the electrolyte 4 in the first space 31 and the second space 32, the one that has the higher state of charge is distributed to the battery cell 10. For example, if the electrolyte 4 in the first space 31 has a higher state of charge, the valve controller 651 operates the supply-side switching valve 54*s* so as to open the first supply passage 51*s* and close the second supply passage 52*s*. Also, the valve controller 651 operates the discharge-side switching valve 54*d* so as to open the second discharge passage 52*d* and close the first discharge passage 51*d*. At this time, the pump controller 652 temporarily stops the pump 55 before the valve controller 651 starts the above-described control, and drives the pump 55 after the valve controller 651 has completed the above-described control. Due to this control, the electrolyte 4 in the first space 31 passes through the first supply passage 51*s* and the supply-side connection passage 53*s* in this order, and is supplied to the battery cell 10 and is discharged. The electrolyte 4 that has been discharged in the battery cell 10 and whose state of charge has decreased passes through the discharge-side connection passage 53*d* and the second discharge passage 52*d* in this order and is discharged into the second space 32.

When substantially all of the electrolyte 4 in the first space 31 has passed through the battery cell 10 and is distributed into the second space 32, as described in Embodiment 1, the first liquid amount detector 61 detects that the amount of the electrolyte in the first space 31 is zero. Then, the valve controller 651 performs control such that this procedure is the reverse of the above-described procedure. That is, the valve controller 651 operates the supply-side switching valve 54*s* so as to open the second supply passage 52*s* and close the first supply passage 51*s*. Also, the valve controller 651 operates the discharge-side switching valve 54*d* so as to open the first discharge passage 51*d* and close the second discharge passage 52*d*. As described above, the pump controller 652 temporarily stops the pump 55 before the valve controller 651 starts the above-described control, and drives the pump 55 after the valve controller 651 has completed the above-described control. Due to this control, the electrolyte 4 stored in the second space 32 passes through the second supply passage 52*s* and the supply-side connection passage 53*s* in this order, and is supplied to the battery cell 10 and is discharged. The electrolyte 4 discharged in the battery cell 10 is discharged from the battery cell 10 into the first space 31, passing through the discharge-side connection passage 53*d* and the first discharge passage 51*d* in this order.

When the state of charge of the electrolyte 4 reaches the end of discharge, this control ends.

Note that if the state of charge of the electrolyte 4 in the first space 31 is less than a threshold, this control need not be performed. In this case, the electrolyte 4 is charged by distributing the electrolyte 4 in the second space 32 with a low state of charge to the battery cell 10.

When the presence/absence detector 653 has detected that the power request was not made, the calculation part 654 calculates the state of charge of the electrolyte 4 in the first space 31 and the state of charge of the electrolyte 4 in the second space 32. The valve controller 651 controls the operations of the supply-side switching valve 54*s* and the discharge-side switching valve 54*d* such that out of the electrolyte 4 in the first space 31 and the second space 32, the one that has the lower state of charge is distributed to the battery cell 10. For example, if the electrolyte 4 in the second space 32 has a lower state of charge, the valve controller 651 operates the supply-side switching valve 54*s* so as to open the second supply passage 52*s* and close the first supply passage 51*s*. Also, the valve controller 651 operates the discharge-side switching valve 54*d* so as to open the first discharge passage 51*d* and close the second discharge passage 52*d*. At this time, the pump controller 652 temporarily stops the pump 55 before the valve controller 651 starts the above-described control, and drives the pump 55 after the valve controller 651 has completed the above-described control. Due to this control, the electrolyte 4 stored in the second space 32 passes through the second supply passage 52*s* and the supply-side connection passage 53*s* in this order, and is supplied to the battery cell 10 and is charged. The electrolyte 4 charged in the battery cell 10 passes through the discharge-side connection passage 53d and the first discharge passage 51d in this order, and is discharged into the first space 31.

When substantially all of the electrolyte 4 in the second space 32 has passed through the battery cell 10 and is distributed into the first space 31, as described in Embodiment 1, the second liquid amount detector 62 detects that the amount of the electrolyte in the second space 32 is zero. Then, the valve controller 651 and the pump controller 652 perform control such that this procedure is the reverse of the above-described procedure. That is, the valve controller 651 operates the supply-side switching valve 54s so as to open the first supply passage 51s and close the second supply passage 52s. Also, the valve controller 651 operates the discharge-side switching valve 54d so as to open the second discharge passage 52d and close the first discharge passage 51d. As described above, the pump controller 652 temporarily stops the pump 55 before the valve controller 651 starts the above-described control, and drives the pump 55 after the valve controller 651 has completed the above-described control. Due to this control, the electrolyte 4 stored in the first space 31 passes through the first supply passage 51s and the supply-side connection passage 53s in this order, and is supplied to the battery cell 10 and is charged. The electrolyte 4 charged in the battery cell 10 is discharged from the battery cell 10 into the second space 32, passing through the discharge-side connection passage 53d and the second discharge passage 52d in this order.

When the state of charge of the electrolyte 4 reaches the fully charged state, this control ends.

Effects

With the RF battery 1 of this embodiment, it is possible to switch the flow of the electrolyte 4 before substantially all of the electrolyte 4 stored in either the first space 31 or the second space 32 has been distributed into the other space through the battery cell 10. Therefore, even if the load 130 has made a power request during charge, for example, it is possible to immediately handle the power request made by the load 130.

The present invention is defined by the terms of the claims, but not limited to the above description, and is intended to include any modifications within the meaning and scope equivalent to the terms of the claims.

LIST OF REFERENCE NUMERALS

1 RF battery
10 Battery cell
10m Measurement part
10r Standard electrode
10v Voltage measurement part
20 Cell stack
3 Tank
31 First space
32 Second space
33 Top plate
34 Bottom plate
35 Side plate
36 Partition portion
361 Outer region
362 Inner region
4 Electrolyte
5 Distribution mechanism
51s First supply passage
51d First discharge passage
52s Second supply passage
52d Second discharge passage
53s Supply-side connection passage
53d Discharge-side connection passage
54s Supply-side switching valve
54d Discharge-side switching valve
55 Pump
56s Branched passage
56d Branched passage
6 Control mechanism
61 First liquid amount detector
62 Second liquid amount detector
65 Controller
651 Valve controller
652 Pump controller
653 Presence/absence detector
654 Calculation part
100 AC/DC converter
110 Power generation portion
120 Electrical substation
130 Load

The invention claimed is:

1. A redox flow battery comprising:
a tank configured to store an electrolyte; and
a distribution mechanism to distribute the electrolyte to a battery cell;
wherein the tank has a partition portion partitioning a space inside the tank into a first space and a second space,
the distribution mechanism includes:
a first supply passage to supply the electrolyte in the first space to the battery cell;
a second supply passage to supply the electrolyte in the second space to the battery cell;
one supply-side connection passage connecting downstream sides of the first supply passage and the second supply passage to the battery cell;
a first discharge passage to discharge the electrolyte that has passed through the battery cell into the first space;
a second discharge passage to discharge the electrolyte that has passed through the battery cell into the second space;
one discharge-side connection passage connecting upstream sides of the first discharge passage and the second discharge passage to the battery cell;
a supply-side switching valve that is provided at a location where the first supply passage, the second supply passage, and the supply-side connection passage are connected to each other, the supply-side switching valve being configured to switch between allowing a flow of the electrolyte from the first supply passage to the supply-side connection passage and allowing a flow of the electrolyte from the second supply passage to the supply-side connection passage; and
a discharge-side switching valve that is provided at a location where the first discharge passage, the second discharge passage, and the discharge-side connection passage are connected to each other, the discharge-side switching valve being configured to switch between allowing a flow of the electrolyte from the discharge-side connection passage to the first discharge passage and allowing a flow of the electrolyte from the discharge-side connection passage to the second discharge passage, and
the partition portion is composed of a flexible material.

2. The redox flow battery according to claim 1,
wherein the partition portion has an outer region provided at an entire peripheral edge of the partition portion and an inner region surrounded by the outer region,
a region of the outer region that comes into contact with the electrolyte is substantially liquid-tightly fixed to an inner surface of the tank, and
the inner region allows change in volumes of spaces such that a volume of one of the first space and the second space increases and a volume of the other space decreases along with an increase or a decrease in an amount of the electrolyte in the first space and the second space.

3. The redox flow battery according to claim 1, further comprising:
a liquid amount detector configured to detect at least one of the amount of the electrolyte in the first space and the amount of the electrolyte in the second space; and
a valve controller configured to control operations of the supply-side switching valve and the discharge-side switching valve based on a result of detection performed by the liquid amount detector.

4. The redox flow battery according to claim 1, further comprising:
a presence/absence detector configured to detect whether or not a power request was made by a load to which power is to be supplied from the redox flow battery;
a calculation part configured to calculate a state of charge of the electrolyte in the first space and the state of charge of the electrolyte in the second space; and
a valve controller configured to control operations of the supply-side switching valve and the discharge-side switching valve based on a result of detection performed by the presence/absence detector and a result of calculation performed by the calculation part.

5. The redox flow battery according to claim 1,
wherein the partition portion has an outer region provided at an entire peripheral edge of the partition portion and an inner region surrounded by the outer region,
the outer region is fixed to a peripheral edge of a top plate of the tank, and the partition portion is suspended from the top plate of the tank, and
the first space and the second space are provided in an inward space and an outward space inside the tank.

6. The redox flow battery according to claim 2, further comprising:
a liquid amount detector configured to detect at least one of the amount of the electrolyte in the first space and the amount of the electrolyte in the second space; and
a valve controller configured to control operations of the supply-side switching valve and the discharge-side switching valve based on a result of detection performed by the liquid amount detector.

7. The redox flow battery according to claim 2, further comprising:
a presence/absence detector configured to detect whether or not a power request was made by a load to which power is to be supplied from the redox flow battery;
a calculation part configured to calculate a state of charge of the electrolyte in the first space and the state of charge of the electrolyte in the second space; and
a valve controller configured to control operations of the supply-side switching valve and the discharge-side switching valve based on a result of detection performed by the presence/absence detector and a result of calculation performed by the calculation part.

8. The redox flow battery according to claim 2,
wherein the partition portion has an outer region provided at an entire peripheral edge of the partition portion and an inner region surrounded by the outer region,
the outer region is fixed to a peripheral edge of a top plate of the tank, and the partition portion is suspended from the top plate of the tank, and
the first space and the second space are provided in an inward space and an outward space inside the tank.

9. The redox flow battery according to claim 3,
wherein the partition portion has an outer region provided at an entire peripheral edge of the partition portion and an inner region surrounded by the outer region,
the outer region is fixed to a peripheral edge of a top plate of the tank, and the partition portion is suspended from the top plate of the tank, and
the first space and the second space are provided in an inward space and an outward space inside the tank.

10. The redox flow battery according to claim 4,
wherein the partition portion has an outer region provided at an entire peripheral edge of the partition portion and an inner region surrounded by the outer region,
the outer region is fixed to a peripheral edge of a top plate of the tank, and the partition portion is suspended from the top plate of the tank, and
the first space and the second space are provided in an inward space and an outward space inside the tank.

11. The redox flow battery according to claim 6,
wherein the partition portion has an outer region provided at an entire peripheral edge of the partition portion and an inner region surrounded by the outer region,
the outer region is fixed to a peripheral edge of a top plate of the tank, and the partition portion is suspended from the top plate of the tank, and
the first space and the second space are provided in an inward space and an outward space inside the tank.

12. The redox flow battery according to claim 7,
wherein the partition portion has an outer region provided at an entire peripheral edge of the partition portion and an inner region surrounded by the outer region,
the outer region is fixed to a peripheral edge of a top plate of the tank, and the partition portion is suspended from the top plate of the tank, and
the first space and the second space are provided in an inward space and an outward space inside the tank.

* * * * *